(12) United States Patent
Wittenberg

(10) Patent No.: US 6,831,447 B1
(45) Date of Patent: Dec. 14, 2004

(54) SURGE LIMITING CIRCUIT WITH OPTIONAL SHORT CIRCUIT DETECTION

(75) Inventor: John W. Wittenberg, Allen, IN (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 1 day.

(21) Appl. No.: 10/441,015

(22) Filed: May 20, 2003

(51) Int. Cl.[7] .............................................. G05F 1/656
(52) U.S. Cl. ...................... 323/222; 323/908; 323/223; 323/901
(58) Field of Search ................................ 323/222, 908, 323/223, 224, 901

(56) References Cited

U.S. PATENT DOCUMENTS

| | | | | |
|---|---|---|---|---|
| 4,744,369 A | * | 5/1988 | Kroll ........................ | 600/509 |
| 5,079,455 A | * | 1/1992 | McCafferty et al. ........ | 327/318 |
| 5,122,724 A | * | 6/1992 | Criss ........................ | 323/222 |
| 5,374,887 A | * | 12/1994 | Drobnik .................... | 323/299 |
| 5,930,130 A | * | 7/1999 | Katyl et al. ............... | 363/53 |
| 6,438,002 B2 | * | 8/2002 | Alhoussami ............... | 363/50 |

* cited by examiner

*Primary Examiner*—Bao Q. Vu
(74) *Attorney, Agent, or Firm*—Edell, Shapiro & Finnan, LLC

(57) ABSTRACT

A method and apparatus for protecting circuit components from inrush current. A field effect transistor (FET) is controlled to provide a source of dynamic impedance, placed in series with a circuit component to be protected. The circuit uses a current limiting circuit to limit current flow into a small capacitor across the gate of the FET, thus controlling the rate at which the small capacitor charges, and hence, the rate at which the FET transitions from an "off" state with high in-series impedance to an "on" state with low in-series impedance. The current limiting circuit can be supplemented with a short circuit detection circuit that terminates current flow into the current limiting circuit upon a short circuit in the protected component. The surge limiting circuit, with optional short circuit detection, can be integrated within larger integrated circuits or produced as a discrete device with or without an imbedded protected component.

22 Claims, 5 Drawing Sheets

US 6,831,447 B1

SURGE LIMITING CIRCUIT WITH OPTIONAL SHORT CIRCUIT DETECTION

FIELD OF THE INVENTION

The present invention relates to electronic circuits for limiting inrush current and, more particularly, to a surge limiting circuit capable of limiting inrush current to a protected electronic circuit component, without reducing the steady-state effectiveness of the protected component within a circuit.

DESCRIPTION OF THE RELATED ART

The need to limit inrush current to prevent damage to electronic components, such as capacitors, is well established. One technique is to place a static impedance (e.g., a resistor) in series with the component to be protected to limit the amount of current that can pass through the component upon providing power to the circuit in which the component is used. The size of the resistor used is selected based upon the magnitude of the source and transient voltages expected to be applied to the circuit.

There are several problems associated with the use of static resistors in such a manner. Upon the circuit reaching a steady state condition, the static resistor impedance value remains in series with the protected component, resulting in undesirable effects. For example, the in-series impedance results in a wasteful dissipation of energy, long after the risk of damage due to inrush current has subsided. Furthermore, placing a resistor in series with a capacitor used to filter circuit transients reduces the effectiveness of the capacitor in filtering such transients due to the voltage across the in-series resistor. The magnitude of such undesirable effects, as well as the amount of surge protection provided by an in-series resistor, is directly proportional to the size of the in-series impedance. As a result, in choosing the size of an in-series static resistor, a circuit designer typically balances the amount of surge protection desired against the magnitude of the undesirable effects, described above.

It is well know in the art that many of the undesirable effects associated with using in-series static impedance to suppress inrush current can be avoided by replacing the in-series resistor with a Field Effect Transistor (FET) that provides dynamic in-series impedance. Typically the drain-to-source pathway of the FET is placed between the component to be protected, such as a capacitor, and ground and a small capacitor is connected between the FET gate terminal and the FET source terminal. The drain-to-source impedance of an FET is very high until a threshold voltage is applied to the FET gate to bias the FET in an "on" state, thus establishing a low impedance drain-to-source pathway. In conventional FET-based surge limiting circuits, when a power source is connected to the circuit, the capacitor between the FET gate and ground slowly builds charge creating an slow increase in the voltage across the capacitor (and hence the FET gate). In this manner, the FET slowly activates, and FET drain-to-source impedance is slowly diminished from a very high impedance value to a very low impedance value. Use of an FET in place of a static in-series resistor provides a high initial in-series impedance that gradually reduces to a nominal FET drain-to-source "on" impedance, typically on the order of 0.01 ohms. In this manner, many of the undesirable effects associated with a fixed in-series impedance are significantly reduced.

However, even after substitution of an FET to provide dynamic in-series impedance, several difficulties still remain. For example, conventional circuits do not adequately control the rate at which the FET gate capacitor charges under a wide variety of applied circuit voltages and transients. If the FET gate capacitor charges too rapidly, the in-series impedance provided by the FET may not be reduced slowly enough to avoid damage to the protected circuit element due to inrush current. Furthermore, methods used by conventional circuit designs to protect the FET from over-voltage gate conditions are not compatible with integrated circuit production techniques and often result in a significant shunt current during over-voltage conditions.

One conventional inrush protection approach based upon use of an FET is presented in U.S. Pat. No. 5,122,724, entitled, "Inrush Current Limiter" (hereinafter referred to as the '724 patent), suffers from both the undesirable effects described above. FIG. 1 of the '724 patent is presented at FIG. 1 herein and is labeled "Prior Art." As described in the '724 patent, static impedance R1, shown in FIG. 1, is used to control the voltage applied to the FET gate, and thus, the value of the in-series drain-to-source impedance of FET Q1 under steady-state conditions.

While such an approach may be sufficient under controlled voltage conditions, the current through R1 is based upon the voltage across load resistor R, which is subjected to transients. Thus, the rate at which current flows into gate capacitor C1 can vary, resulting in gate capacitor C1 charging at an unpredictable rate and reaching the gate threshold voltage in an unpredictable amount of time. Such a condition can result in reduction of the in-series FET drain-to-source impedance at too rapid a rate, resulting in significant inrush current into, and potential damage to, capacitor C2.

Another deficiency associated with the circuit described in patent '724 is the use of a zener diode to protect the FET from gate over-voltage conditions. Such a zener diode is needed because R1, cannot protect the FET gate from over-voltage conditions resulting from uncontrolled voltage conditions across load resistor R, as described above. Such zener diodes are difficult to construct using integrated circuit production techniques, resulting in increased production costs or forcing the use of a discrete zener diode component, thereby increasing circuit board real-estate and increasing the number of soldered circuit connections, and hence, increasing production defect rates and increasing field failure rates of the surge limiting circuit.

Hence, a surge limiting circuit is needed that maintains positive control over the flow of current that charges the FET gate capacitor, thereby maintaining positive control over the rate at which the FET turns-on, the rate at which FET drain-to-source impedance is diminished, and the rate of inrush current into a protected circuit component. Further, a surge limiting circuit is needed that eliminates the need for zener diode over-voltage protection of the FET gate, thereby reducing production costs, decreasing circuit defect rates and increasing surge limiting circuit reliability.

SUMMARY OF THE INVENTION

Therefore, in light of the above, and for other reasons that will become apparent when the invention is fully described, an object of the present invention is to protect sensitive circuit components against inrush current over a wide variety of input power conditions, without affecting steady-state performance of the protected circuit components.

A further object of the present invention is to maintain positive control over the duration and level of inrush protection provided to a protected circuit component despite a wide variety of input power conditions.

Yet a further object of the present invention is to improve performance and reduce the cost of producing circuits that include inrush current protection.

A still further object of the present invention is to improve performance and reduce the cost of producing discrete electronic components with integrated inrush circuit protection.

The aforesaid objects are achieved individually and in combination, and it is not intended that the present invention be construed as requiring two or more of the objects to be combined unless expressly required by the claims attached hereto.

In accordance with the present invention, a surge limiting circuit is described for limiting an inrush current through a protected circuit path in a circuit in response to application of power to the circuit. A non-limiting, representative embodiment of the present invention includes a field effect transistor connected in series with the protected circuit path and a current control circuit coupled to a gate terminal of the field effect transistor for controlling turn on of the field effect transistor. The current control circuit supplies a predetermined current to the gate terminal of the field effect transistor in response to application of power to the circuit, such that the field effect transistor turns on at a predetermined rate to prevent inrush current from flowing through the protected circuit path.

The above and still further objects, features and advantages of the present invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
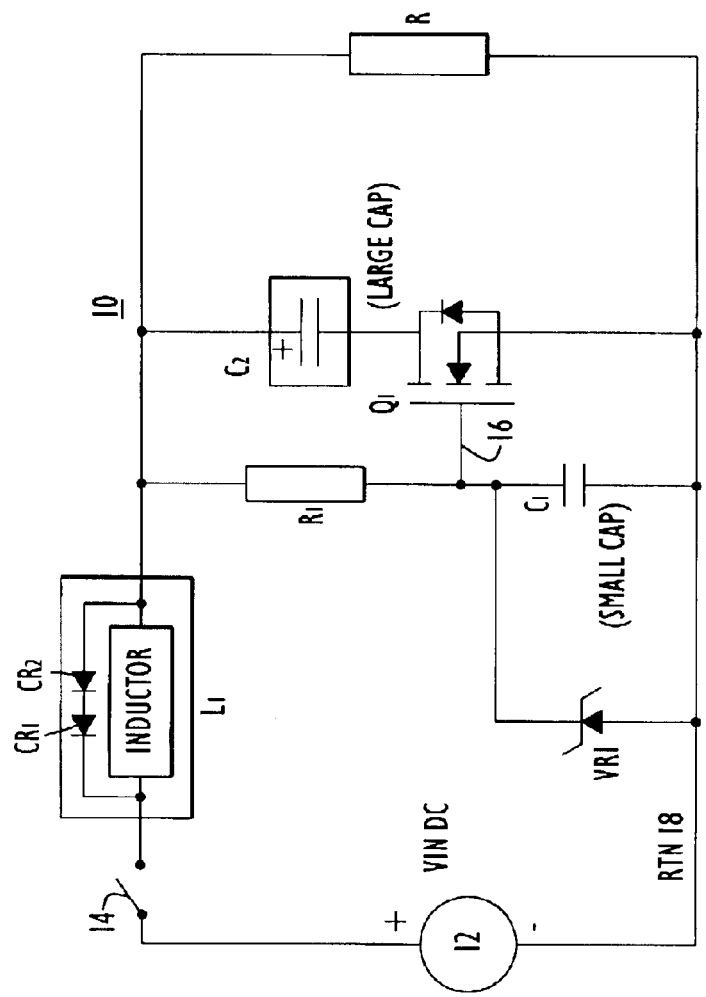
FIG. 1 is a schematic illustration of a surge limiting circuit according to a conventional inrush current protection circuit.

Preferred embodiments according to the present invention are described below with reference to the above drawings, in which like reference numerals designate like components.

Figure 2:
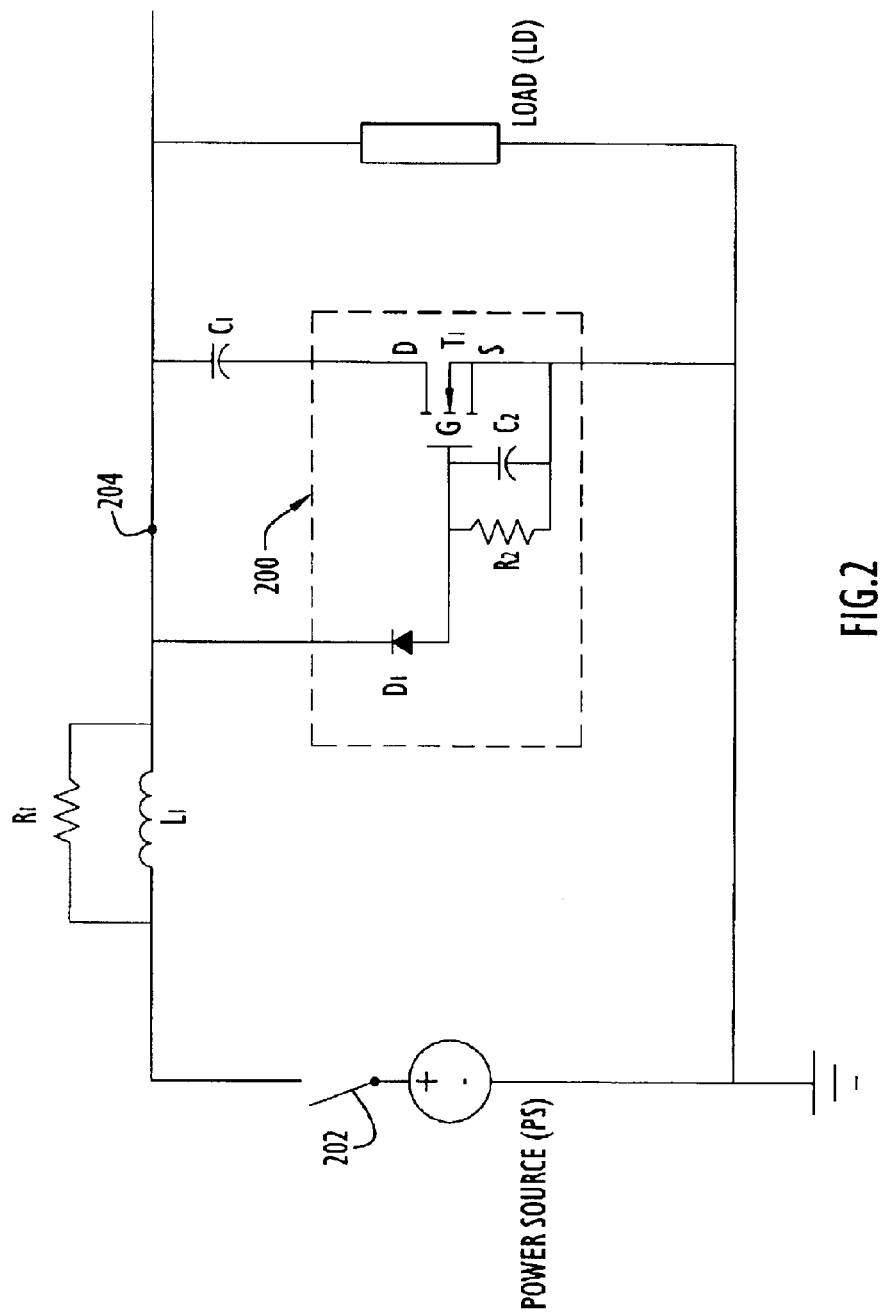
FIG. 2 is a schematic illustration of a surge limiting circuit according to a first embodiment of the present invention, within context of a representative circuit.

FIG. 2 presents a filter circuit in which parallel inductor/resistor pair L1∥R1, connected in series to the positive lead of a power source PS, works in conjunction with a tantalum low equivalent series resistance (low-ESR) capacitor C1 to filter transients in a circuit load LD. As shown in FIG. 2, capacitor C1 is connected to the low-voltage terminal of L1∥R1, in parallel with L1∥R1 and source PS between a common node 204 and ground. Furthermore, capacitor C1 is connected in parallel across filtered load LD between common node 204 and ground.

Although a tantalum low-ESR capacitor, such as C1, is ideal for use as a filter capacitor, due to the capacitor's low-ESR characteristics, such low-ESR capacitors are also highly susceptible to damage from high in-rush electrical current at circuit start-up due, in part, to the same low-ESR capacitor characteristics.

As shown in FIG. 2, capacitor C1 is protected from damage from high inrush current by a surge limiting circuit 200, in accordance with a non-limiting, representative embodiment of the present invention. Surge limiting circuit 200 places a drain-to-source path of a metal oxide semiconductor field effect transistor (MOSFET) T1, in series with capacitor C1 between the low-voltage terminal of capacitor C1 and ground. In one non-limiting, representative embodiment, T1 is a low RDS-on MOSFET, meaning that when the transistor is in the "on" state, the resistance drain-to-source is very low (i.e., low RDS-on). One commercially available MOSFET appropriate for use in such an embodiment is Product Number Si2316DS, N-Channel 30-V (D-S) MOSFET, manufactured by VISHAY INTERTECHNOLOGY, INC.

Surge limiting circuit 200 also includes a current control circuit configured to control transistor T1 to serve as a source of dynamic drain-to-source in-series impedance to protect capacitor C1 from potentially damaging high inrush current upon the closing of a switch 202 and applying power to the circuit. Specifically, the current control circuit includes a current limiting circuit that supplies a predetermined current to the gate terminal of the field effect transistor, and a transistor control circuit that is coupled to the gate terminal and another terminal of the field effect transistor. The transistor control circuit controls the turn-on rate of the field effect transistor in response to the predetermined current from the current limiting circuit. In this manner, the field effect transistor under the control of the current control circuit, limits the inrush current through the protected circuit path that includes protected capacitor C1.

In the non-limiting, representative embodiment presented in FIG. 2, a current limiting diode D1, that serves as a current limiting circuit, is connected from common node 204, shared by capacitor C1, L1∥R1, and load LD, to the gate terminal of transistor T1. The current limiting circuit supplies a predetermined current to a parallel resistor/capacitor pair R2∥C2 connected between the gate and source nodes of transistor T1, that serves as the transistor control circuit.

In FIG. 2, the current limiting circuit includes a current limiting diode D1 that serves as a current source. The current limiting circuit is not limited to a current limiting diode but can include any component/components that function as a current source and limit current flow to the transistor control circuit and gate of transistor T1. For example, a junction field effect transistor (JFET) can be used in place of diode D1.

When in the "off" state, transistor T1 resistance drain-to-source (RDS) is very high, and serves to prevent a sudden rush of current into capacitor C1, at circuit power up.

However, when transistor T1 is "on," the resistance drain-to-source is very low (i.e., low RDS-on), thereby essentially eliminating transistor T1 from the circuit during steady state operation of the circuit, and thereby optimizing the filtering capability of capacitor C1. By transitioning transistor T1 from an "off" state, when power is first applied to the circuit, to an "on" state at a very controlled rate, surge limiting circuit 200 allows capacitor C1 to receive its initial charge gradually over a highly controlled period of time, thus protecting capacitor C1 from potential damage from inrush current when switch 202 is closed.

Referring to FIG. 2, upon applying power to the circuit by closing switch 202, current limiting diode, D1, acts as a current source from common node 204 to the R2||C2 pair positioned across the gate and source terminals of transistor T1. By controlling the flow of current into capacitor C2, capacitor C2 charges at a highly controlled rate, despite any transient power conditions at node 204 that may occur during the startup inrush period. As a result of the controlled charge time, the voltage across capacitor C2, and hence the gate voltage applied to transistor T1, increases at a consistent, controlled rate, resulting in a slow turn-on of the transistor T1.

As the transistor gate voltage reaches the threshold voltage of transistor T1, transistor T1 transitions to an "on" state in which the drain-to-source impedance is responsive to the voltage applied to the transistor gate. Capacitor C2 and resistor R2 are selected based upon the characteristics of transistor T1 so that, working together in the context of surge limiting circuit 200, capacitor C1 is allowed to charge gradually as the voltage across capacitor C2 gradually increases and the drain-to-source impedance of transistor T1 gradually diminishes. Further, resistor R2 bleeds off the stored charge on capacitor C2 when power to the circuit is turned off, to prepare the transistor control circuit for the next power-on inrush current event.

By controlling the rate of current into capacitor C2, with current limiting diode D1, the rate at which transistor T1 is biased to the "on" position, and hence the rate at which the drain to source impedance of transistor T1 is reduced, is under gradual positive control despite dramatic transient power conditions. In this manner capacitor C1 is protected from sudden inrush currents that could occur if capacitor C2 were to charge at too rapid a rate, as can occur as a result of transient power conditions in conventional surge limiting circuit designs, as discussed in relation to FIG. 1. Furthermore, by controlling the current flow through D1, over-voltage conditions at the gate to transistor T1, across R2||C2 cannot arise, assuming that resistor R2 and capacitor C2 have been properly matched with the gate characteristics of transistor T1. This eliminates the need for zener diode over-voltage protection as provided in conventional circuits, such as in patent '724 discussed above.

It should be noted that, preferably, power source PS includes monitoring circuits that temporarily disengage the power source if a surge in power indicates an abnormality in the load circuitry, such as a short circuit. Once power is disengaged, such a conventional power supply typically waits a predetermined period of time, thereby providing the load circuitry an opportunity to discharge and reset/reconfigure damaged circuits, before power is reengaged. Such power supplies are commonly used in space-based applications, but are also commonly used in earth based applications. Use of such a power supply capability is discussed further with respect to FIG. 6, below. Although such a self-monitoring power supply is preferred, use of a self monitoring power supply is not required for use with the surge limiting circuit described here.

Figure 3:
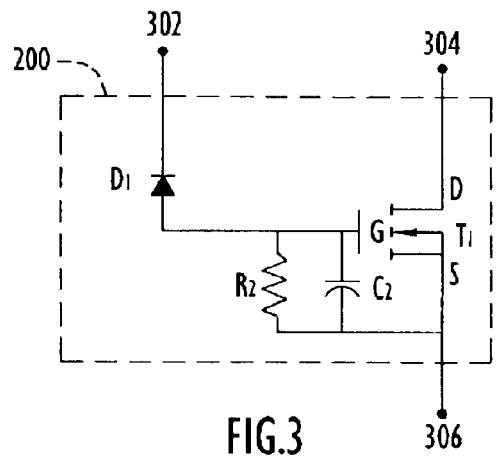
FIG. 3 is a schematic illustration of a discrete three node device containing the surge limiting circuit according to a first embodiment of the present invention.

FIG. 3 presents a non-limiting, representative embodiment of the surge limiting circuit, described above with respect to FIG. 2, configured as a three terminal discrete device. As described with respect to FIG. 2, the surge limiting circuit includes a field effect transistor T1, a current limiting circuit and a transistor control circuit.

The three terminal device, shown in FIG. 3 is inserted within a circuit so that a component to be protected is placed in series with the drain-to-source circuit path of transistor T1. Once inserted into a circuit in such a manner, the surge limiting circuit 200 components shown in FIG. 3, operate and interact with each other in the same manner described with respect to FIG. 2. Current limiting diode D1 acts as a current limiting circuit, providing a predetermined limited current flow from node 302 to the transistor control circuit (i.e., resistor R2 and capacitor C2 in parallel spanning from the gate terminal of transistor T1 to the source terminal of transistor T1.) Upon charging capacitor C2 to the gate threshold voltage of transistor T1, transistor T1 begins to turn on, and the drain-to-source impedance begins to drop, thereby reducing the impedance along the protected circuit pathway spanning from node 304 to node 306 that is configured in series with the component to be protected, as described above.

The surge limiting circuit design presented in FIG. 3 can be stored in an integrated circuit library for inclusion in a variety of integrated circuit devices, and/or produced as a discrete integrated circuit device for use with discrete circuit components, as described above. In one non-limiting, representative use, a two lead component to be protected from inrush current with a dynamic in-series impedance, as described above, is connected between node 302 and node 304. The protected component is then placed into a circuit using node 302 and 306 as the new leads of the protected component.

The surge limiting circuit presented in FIG. 2 and FIG. 3 supports a broad range of voltages and can be used to protect a wide variety of circuit components from damage due to inrush current. In one non-limiting, representative embodiment of the circuit described with respect to FIG. 2, the source voltage is 28 volts with ±50 volt 500 psec transients. The load current, LD, is expected to be 10 amps at 5 KHz and filtering capacitor C1 is 10 $\mu f$. In such a representative, non-limiting configuration, simulations have demonstrated strong inrush protection performance of a representative circuit in which current limiting diode, D1, limits current to 100 microamperes, resistor R2 is 42K ohms, capacitor C2 is 100 picofarads, and metal oxide semiconductor field effect transistor (MOSFET) T1, has a drain-to-source "on" impedance (RDS "on") of 0.015 ohms. However, such values are merely associated with a non-limiting, representative embodiment of the present invention and the present invention is not meant to be limited in any way by the use of these representative values in such a non-limiting, representative embodiment.

Depending on the input and transient voltage that this non-limiting, representative inrush current protection circuit is expected to support the characteristics of the current limiting diode, D1, resistor R2 and capacitor C2 and the gate voltage response of transistor T1 may require adjustment to assure that the circuit operates within the necessary operating ranges, and that gate capacitor charging period and T1 response to rising gate voltage provides a sufficiently slow turn-on to allow capacitor C1 time to fully charge and avoid damaging levels of inrush current. As a result, several variations of the integrated circuit device presented in FIG. 3 may be produced so that the operational demands of different circuits can be supported with appropriate inrush protection.

Figure 4:
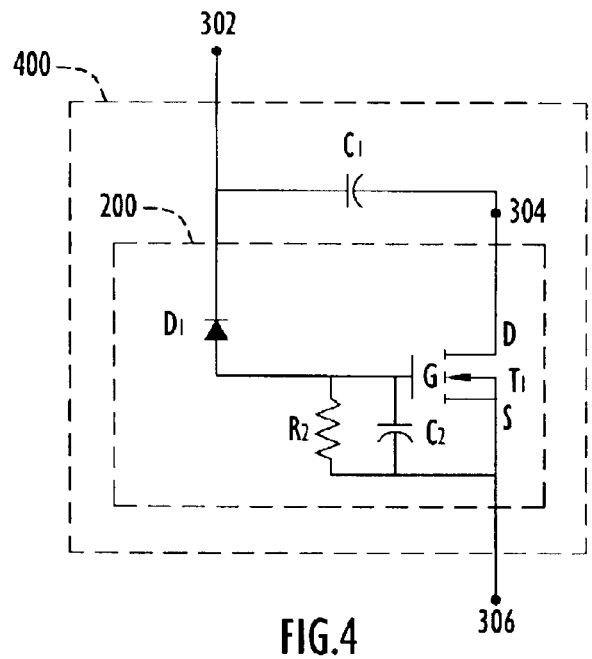
FIG. 4 is a schematic illustration of a two node surge protected capacitor in which the surge limiting circuit according to the first embodiment of the present invention is integrated within the capacitor device package.

FIG. 4 presents a non-limiting, representative embodiment of the surge limiting circuit, described above with respect to FIG. 3, packaged with a capacitor in a single, integrated two terminal device 400. As described with respect to FIG. 2, the surge limiting circuit 200 included in the device presented in FIG. 4 includes a field effect transistor T1, a current limiting circuit and a transistor control circuit.

The two-terminal device 400 shown in FIG. 4 protects capacitor C1, positioned between nodes 302 and 304, with an integrated surge limiting circuit, as described above with respect to FIG. 2 and FIG. 3, yet the two-terminal device can be used in any circuit as a simple capacitor. Further, any two terminal device can be protected in a similar manner by substituting the component to be protected in place of capacitor C1. When the two terminal device is inserted into a circuit, the surge limiting circuit components within the two-terminal device operate and interact with each other in the same manner as described with respect to FIG. 2 and FIG. 3. Current limiting diode D1 acts as a current limiting circuit, providing current from node 302 to the transistor control circuit (i.e., resistor R2 and capacitor C2 in parallel spanning from the gate terminal of transistor T1 to the source terminal of transistor T1.) Upon charging capacitor C2 to the gate threshold voltage of transistor T1, transistor T1 begins to turn on, and the drain-to-source impedance begins to drop, thereby reducing the impedance along the protected circuit pathway spanning from node 302 to node 306, through capacitor C1.

Figure 5:
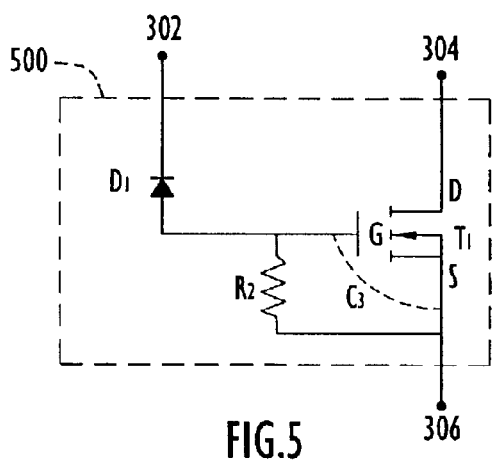
FIG. 5 is a schematic illustration of a discrete three node device containing the surge limiting circuit according to a second embodiment of the present invention.

FIG. 5, presents an alternative embodiment 500 of the surge limiting circuit described with respect to FIG. 3. In FIG. 3, the transistor control circuit is shown as resistor R2 in parallel with capacitor C2 (R2∥C2) spanning from the gate terminal of transistor T1 to a source terminal of transistor T1. However, in FIG. 5, capacitor C2 has been removed and replaced with the internal gate capacitance C3 of transistor T1. In FIG. 5, internal gate capacitance C3 is depicted as a dashed arc between the gate terminal of T1 and the source terminal of T1. Such an approach simplifies the design of the surge limiting circuit, but requires selection of transistor, T1, with an appropriately high gate-to-source capacitance so that transistor, T1, has an appropriately slow transition, or turn-on, from "off" to "RDS-on," as described above.

The three terminal device, shown in FIG. 5 is inserted within a circuit so that a component to be protected is placed in series with the drain-to-source circuit path of transistor T1. Once inserted into a circuit in such a manner, the surge limiting circuit components shown in FIG. 5, operate and interact with each other in the same manner described with respect to FIG. 2. Current limiting diode D1 acts as a current limiting circuit, providing a predetermined limited current from node 302 to the transistor control circuit (i.e., resistor R2 and T1 gate capacitance C3 in parallel spanning from the gate terminal of transistor T1 to the source terminal of transistor T1.) Upon charging T1 gate capacitance C3 to the gate threshold voltage of transistor T1, transistor T1 begins to turn on, and the drain-to-source impedance begins to drop, thereby reducing the impedance along the protected circuit pathway spanning from node 304 to node 306 that is configured in series with the component to be protected, as described above.

Conventionally, circuit designers try to avoid high gate capacitance, because high gate capacitance typically involves large gate dimensions and slower transistor response times. The high gate capacitance transistor is contrary to the trend of conventional transistor design. This is because the focus of the present invention is not on increasing transistor speed or on minimizing transistor size, but on the ability to transition a transistor from a state of high drain-to-source impedance to a state of low drain-to-source impedance over a consistent, controlled period of time under a variety of transient conditions. The gate capacitance is made sufficiently high to prevent turn on of the transistor for a predetermined time in response to application of a predetermined current to the gate of the transistor.

Figure 6:
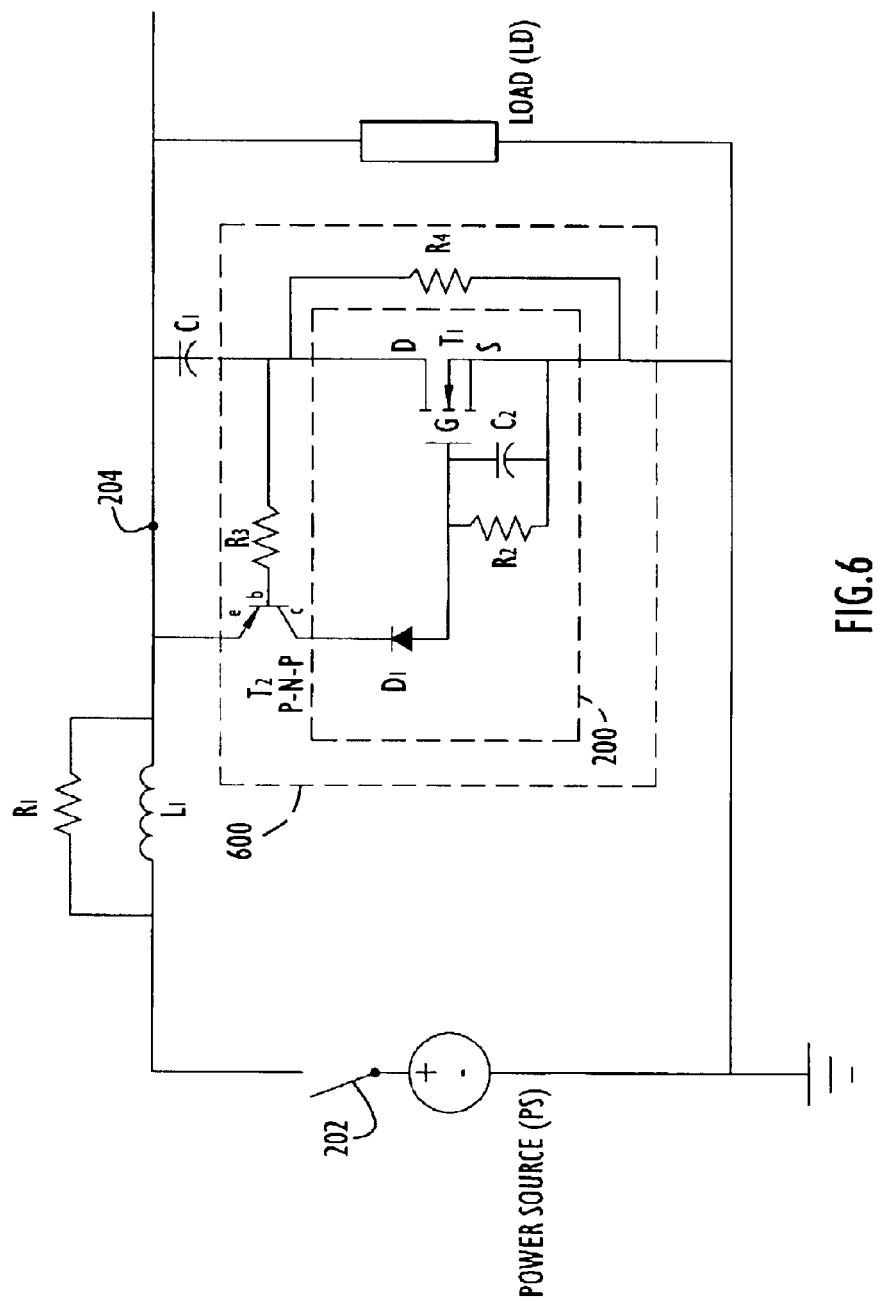
FIG. 6 is a schematic illustration of a surge limiting circuit according to a third embodiment of the present invention, within context of a representative circuit.

FIG. 6 presents an embodiment of the filter circuit presented in FIG. 2, in which surge limiting circuit 200 protects capacitor C1 from damage from high inrush current. In the circuit embodiment presented in FIG. 6, surge limiting circuit 200 (with current limiting diode D1, resistor R2, capacitor C2 and FET transistor T1) operates in the same manner described with respect to FIG. 2, however, surge limiting circuit 200 includes a short circuit control circuit 600 that turns off transistor T1 of surge limiting circuit 200, and restricts current flow through the protected circuit path in the event that capacitor C1 becomes short-circuited. As described above with respect to FIG. 2, power source PS is preferably a self-monitoring power supply that includes monitoring circuits that temporarily disengage power if an abnormality in the load circuitry is detected, such as a short circuit.

As shown in FIG. 6, short circuit control circuit 600 (i.e., elements in FIG. 6 depicted outside of the dashed line box labeled 200 and inside the dashed line box labeled 600) includes a short circuit detection circuit and a failsafe circuit. The short circuit detection circuit includes a PNP bipolar junction transistor T2 positioned with the emitter terminal of the PNP transistor connected at node 204, the collector terminal of the PNP transistor connected to the high-voltage terminal of current limiting diode D1 and the base terminal of the PNP transistor connected in series with a static resistor R3 to the low-voltage terminal of capacitor C1. The failsafe circuit 600 includes a static resistance R4 connected from the low-voltage terminal of capacitor C1 to ground, in parallel with the drain-to-source path of transistor T1. In one non-limiting, representative embodiment, resistor R3 is a 10K static resistor and R4 is a 1K static resistor.

In the event that capacitor C1 becomes short-circuited (e.g., due to capacitor defect, overheating, other malfunction, etc.) the short circuit control circuit 600 prevents capacitor C1 from being fully engaged. When capacitor C1 becomes short-circuited, PNP transistor T2 will not turn on because the collector terminal of PNP transistor T2 and the base terminal of PNP transistor T2 are effectively shorted together, thereby preventing any current from flowing out of the base terminal of PNP transistor T2.

If capacitor C1 is shorted prior to initiation of power source PS, upon initiation of power source PS, transistor T2 will not turn on, resulting in no current flowing through current limiting diode D1 to charge gate capacitor C2. As a result, FET transistor T1 will not turn on and the drain-to-source resistance of transistor T1 between capacitor C1 and ground will remain very high, thereby acting as an open circuit. In this manner, a direct short from node 204 through capacitor C1, and through the drain-to-source path of transistor T2, is avoided. Current flowing through shorted capacitor C1 must pass through resistor R4 to ground. Assuming a self-monitoring power supply is used, as described above, if capacitor C1 becomes shorted after power source PS has been initiated and T1 is fully on, the power source PS will detect the sudden surge in current and temporarily shut down. Upon reinitiating power source PS, the harmful effects of a shorted capacitor C1 are averted, as described above. Assuming a self-monitoring power supply is not used, if capacitor C1 becomes shorted after power source PS has been initiated and T1 is fully on, transistor T2 turns off current to the current limiting circuit, gate capacitor C2 discharges through resister R2 and transistor T1 returns to an off state once the voltage across gate capacitor C2 drops below the threshold voltage for transistor T1. Thereafter, current flowing through shorted capacitor C1 must pass through resistor R4 to ground.

Figure 7:
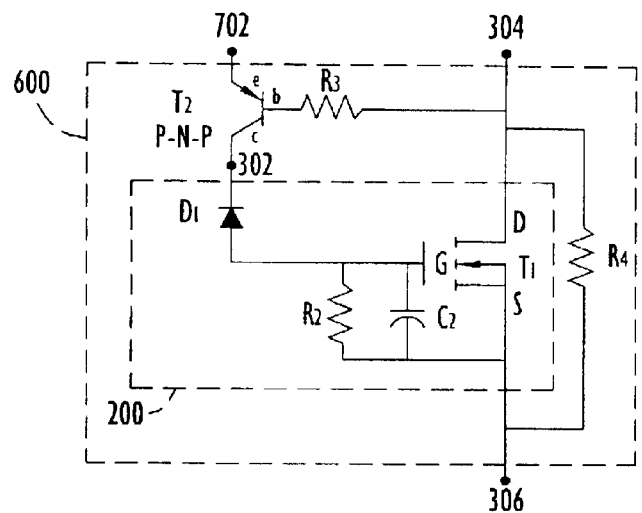
FIG. 7 is a schematic illustration of a discrete three node device containing the surge limiting circuit according to a third embodiment of the present invention.

FIG. 7 presents a non-limiting, representative embodiment of the three terminal discrete device described with respect to FIG. 3, in which the surge limiting circuit 200 includes a short circuit control circuit 600 that turns off transistor T1 of surge limiting circuit 200 in the event that the component protected by the three terminal discrete device becomes short-circuited. As described with respect to FIG. 3, the three terminal device, shown in FIG. 7 is inserted within a circuit so that a component to be protected is placed in series with the drain-to-source circuit path of transistor T1 (e.g., between nodes 304 and 702). Surge limiting circuit 200 (with current limiting diode D1, resistor R2, capacitor C2 and FET transistor T1) operates in the same manner described with respect to FIG. 3, above. With the inclusion of short circuit control circuit 600, however, the benefits of surge limiting circuit 200 are supplemented with short circuit detection capabilities and response as described, in relation to FIG. 6.

In the event that a protected component, positioned in the circuit as described above, becomes short-circuited (e.g., due to defect, overheating, other malfunction, etc.) the short circuit control circuit 600 (i.e., elements in FIG. 7 depicted outside of the dashed line box labeled 200 and inside the dashed line box labeled 600) prevents the protected component from being fully engaged. When the protected component is short-circuited, PNP transistor T2 will not turn on because the collector terminal of PNP transistor T2 and the base terminal of PNP transistor T2 are effectively shorted together, thereby preventing any current from flowing out of the base terminal of PNP transistor T2.

If the protected component is shorted prior to initiation of power source PS, upon initiation of power source PS, transistor T2 will not turn on, resulting in no current flowing through current limiting diode D1 to charge gate capacitor C2. As a result, FET transistor T1 will not turn on and the drain-to-source resistance of transistor T1 between the protected component and ground will remain very high, thereby acting as an open circuit. In this manner, a direct short through the shorted protected component, and through the drain-to-source path of transistor T2 to ground, is avoided. Current flowing through the shorted protected component must pass through resistor R4 to ground. Assuming a self-monitoring power supply is used, as described above, if the protected component becomes shorted after power source PS has been initiated and T1 is fully on, the power source PS will detect the sudden surge in current and temporarily shut down. Upon reinitiating power source PS, the harmful effects of a shorted protected component are averted, as described above. Assuming a self-monitoring power supply is not used, if the protected component becomes shorted after power source PS has been initiated and T1 is fully on, transistor T2 turns off current to the current limiting circuit, gate capacitor C2 discharges through resister R2 and transistor T1 returns to an off state once the voltage across gate capacitor C2 drops below the threshold voltage for transistor T1. Thereafter, current flowing through the shorted protected component must pass through resistor R4 to ground.

Figure 8:
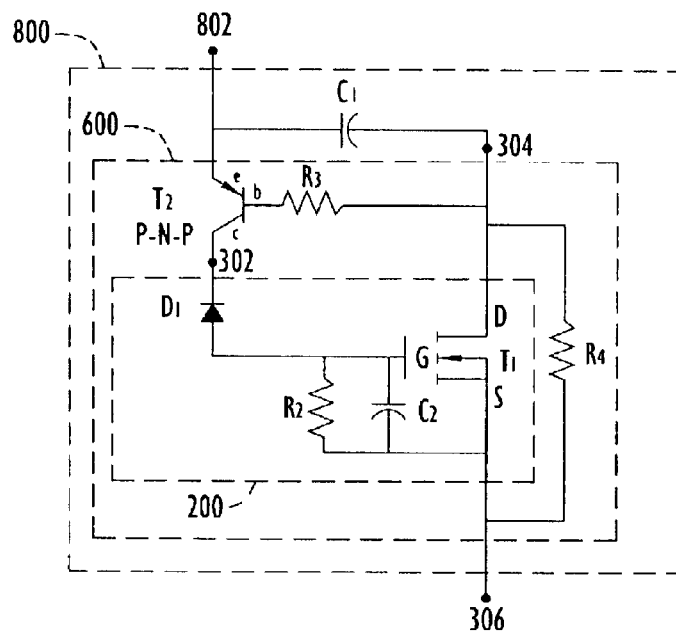
FIG. 8 is a schematic illustration of a two node surge protected capacitor in which the surge limiting circuit according to a third embodiment of the present invention is integrated within the capacitor device package.

FIG. 8 presents a non-limiting, representative embodiment of the two terminal discrete device 800 described with respect to FIG. 4, in which a component to be protected (e.g., capacitor C1) is packaged in a single, integrated two terminal device. In FIG. 8, the surge limiting circuit 200 includes a short circuit control circuit 600 that turns off transistor T1 of surge limiting circuit 200 in the event that capacitor C1 (i.e., the protected component) protected by the two terminal discrete device becomes short-circuited.

The two-terminal device shown in FIG. 8 protects capacitor C1, positioned between nodes 802 and 304, with an integrated surge limiting circuit 200, as described above with respect to FIG. 4. However, any two terminal device can be protected in a similar manner by substituting the component to be protected in place of capacitor. The two-terminal device is further supplemented with a short circuit detection circuit 600 (i.e., elements in FIG. 8 depicted outside of the dashed line box labeled 200 and inside the dashed line box labeled 600) that turns off transistor T1 of surge limiting circuit 200 in the event that the protected component (e.g., capacitor C1, or other protected component) becomes short-circuited. In FIG. 8, surge limiting circuit 200 (with current limiting diode D1, resistor R2, capacitor C2 and FET transistor T1) operates in the same manner described with respect to FIG. 4, above.

In the event that capacitor C1 becomes short-circuited (e.g., due to capacitor defect, overheating, other malfunction, etc.) short circuit control circuit 600 prevents capacitor C1 (other protected component) from being fully engaged. When capacitor C1 becomes short-circuited, PNP transistor T2 will not turn on because the collector terminal of PNP transistor T2 and the base terminal of PNP transistor T2 are effectively shorted together, thereby preventing any current from flowing out of the base terminal of PNP transistor T2.

If capacitor C1 is shorted prior to initiation of power source PS, upon initiation of power source PS, transistor T2 will not turn on, resulting in no current flowing through current limiting diode D1 to charge gate capacitor C2. As a result, FET transistor T1 will not turn on and the drain-to-source resistance of transistor T1 between capacitor C1 and ground will remain very high, thereby acting as an open circuit. In this manner, a direct short from node 802 to ground through capacitor C1, and through the drain-to-source path of transistor T2, is avoided. Current flowing through shorted capacitor C1 must pass through resistor R4 to ground. Assuming a self-monitoring power supply is used, as described above, if capacitor C1 becomes shorted after power source PS has been initiated and T1 is fully on, the power source PS will detect the sudden surge in current and temporarily shut down. Upon reinitiating power source PS, the harmful effects of a shorted capacitor C1 (other protected component) are averted, as described above. Assuming a self-monitoring power supply is not used, if capacitor C1 (other protected component) becomes shorted after power source PS has been initiated and T1 is fully on, transistor T2 turns off current to the current limiting circuit, gate capacitor C2 discharges through resister R2 and transistor T1 returns to an off state once the voltage across gate capacitor C2 drops below the threshold voltage for transistor T1. Thereafter, current flowing through shorted capacitor C1 must pass through resistor R4 to ground.

Figure 9:
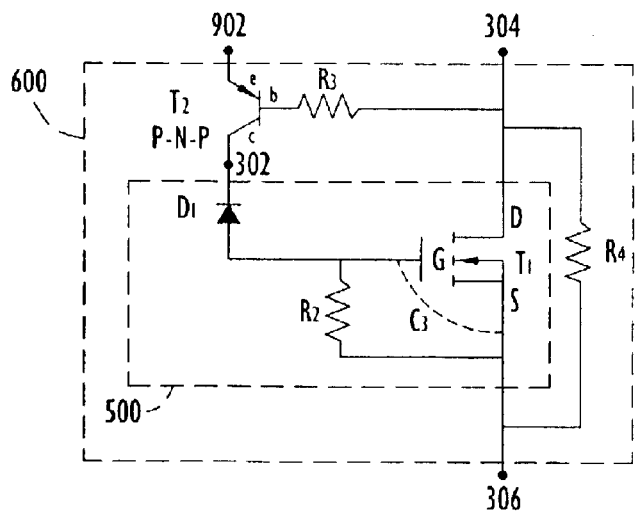
FIG. 9 is a schematic illustration of a discrete three node device containing the surge limiting circuit according to a fourth embodiment of the present invention.

FIG. 9, presents an alternative embodiment of a three terminal device that uses surge limiting circuit 500, described with respect to FIG. 5, in which capacitor C2 of surge limiting circuit 200 has been removed and replaced with the internal gate capacitance C3 of transistor T1. In FIG. 9, surge limiting circuit 500 (with current limiting diode D1, resistor R2, and FET transistor T1 with internal gate-source capacitance C3) operates in the same manner described with respect to FIG. 5, above. In FIG. 9, surge limiting circuit 500 includes short circuit control circuit 600 that turns off transistor T1 of surge limiting circuit 500 in the event that a protected component (connected between node 902 and 304) becomes short-circuited.

In the event that a protected component, positioned in the circuit as described above, becomes short-circuited (e.g., due to defect, overheating, other malfunction, etc.) short circuit control circuit 600 (i.e., elements in FIG. 9 depicted outside of the dashed line box labeled 500 and inside the dashed line box labeled 600) prevents the protected component from being fully engaged. When the protected component becomes short-circuited, PNP transistor T2 will not turn on because the collector terminal of PNP transistor T2 and the base terminal of PNP transistor T2 are effectively shorted together, thereby preventing any current from flowing out of the base terminal of PNP transistor T2.

If the protected component is shorted prior to initiation of power source PS, upon initiation of power source PS, transistor T2 will not turn on, resulting in no current flowing through current limiting diode D1 to charge gate capacitor C2. As a result, FET transistor T1 will not turn on and the drain-to-source resistance of transistor T1 between the protected component and ground will remain very high, thereby acting as an open circuit. In this manner, a direct short through the shorted protected component, and through the drain-to-source path of transistor T2 to ground, is avoided. Current flowing through the shorted protected component must pass through resistor R4 to ground. Assuming a self-monitoring power supply is used, as described above, if the protected component becomes shorted after power source PS has been initiated and T1 is fully on, the power source PS will detect the sudden surge in current and temporarily shut down. Upon reinitiating power source PS, the harmful effects of a shorted protected component are averted, as described above. Assuming a self-monitoring power supply is not used, if the protected component becomes shorted after power source PS has been initiated and T1 is fully on, transistor T2 turns off current to the current limiting circuit, internal capacitance C3 discharges through resister R2 and transistor T1 returns to an off state once the voltage across gate capacitance C3 drops below the threshold voltage for transistor T1. Thereafter, current flowing through shorted protected component must pass through resistor R4 to ground.

It will be appreciated that the embodiments described above and illustrated in the drawings represent only a few of the many ways of implementing a surge limiting circuit with optional short circuit detection.

The surge limiting circuit with optional short circuit detection, described here, can be used to protect any capacitor and any electronic component sensitive to inrush current and is not limited to protecting capacitors, or low ESR tantalum capacitors, as shown in at least one of the non-limiting, representative embodiments, described above. Further, the surge limiting circuit with optional short circuit detection, described here, can be used in any circuit or device and is not limited to use in circuits and/or devices presented in the non-limiting, representative embodiments, above.

The surge limiting circuit, current control circuit, current limiting circuit, transistor control circuit, short circuit detection circuit and failsafe circuit may be implemented using any of a wide variety of electronic components, or combination of components, to achieve the same functional capability as described here. The transistor connected in series with the protected circuit path can be a MOSFET, FET, or any other component with a low RDS-on resistance. The short circuit detection circuit can be implemented using PNP bipolar junction transistor, as described here, or using an NPN bipolar junction transistor or other component in a complementary or similar configuration.

Having described preferred embodiments of a circuit for limiting inrush current with optional short circuit detection, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A surge limiting circuit for limiting an inrush current through a protected circuit path in a circuit in response to application of power to the circuit, comprising:
   a field effect transistor connected in series with the protected circuit path; and
   a current control circuit coupled to a gate terminal of the field effect transistor for controlling turn on of the field effect transistor, wherein the current control circuit supplies a predetermined current to the gate terminal of the field effect transistor in response to application of power to the circuit, such that the field effect transistor turns on at a predetermined rate to prevent inrush current from flowing through the protected circuit path.

2. The surge limiting circuit of claim 1, wherein the circuit is integrated within a three-terminal discrete device.

3. The surge limiting circuit of claim 1, wherein the field effect transistor has a gate capacitance sufficiently large to cause the field effect transistor to turn on at a rate that substantially prevents inrush current from flowing through the protected circuit path.

4. The surge limiting circuit of claim 1, wherein the current control circuit comprises:
   a current limiting circuit that supplies the predetermined current to the gate terminal of the field effect transistor; and
   a transistor control circuit coupled to the gate terminal and another terminal of the field effect transistor, the transistor control circuit controlling a turn-on rate of the field effect transistor in response to the predetermined current from the current limiting circuit such that the field effect transistor limits the inrush current through the protected circuit path.

5. The surge limiting circuit of claim 4, wherein the current limiting circuit is a current limiting diode.

6. The surge limiting circuit of claim 4, wherein the current limiting circuit is a JFET current limiter.

7. The surge limiting circuit of claim 4, wherein the transistor control circuit comprises a capacitor and a resistor in parallel.

8. The surge limiting circuit of claim 4, wherein the transistor control circuit comprises a resistor in parallel with a gate capacitance of the field effect transistor.

9. The surge limiting circuit of claim 1, wherein an element sensitive to inrush current is disposed in the protected circuit path.

10. The surge limiting circuit of claim 9, wherein the circuit is integrated within a two-terminal discrete device.

11. The surge limiting circuit of claim 1, wherein the surge limiting circuit is an integrated circuit.

12. The surge limiting circuit of claim 1, wherein the current control circuit comprises:
- a means for supplying the predetermined current to the gate terminal of the field effect transistor; and
- a means for controlling a tun-on rate of the field effect transistor in response to the predetermined current such that the field effect transistor limits the inrush current through the protected circuit path.

13. The surge limiting circuit of claim 1, wherein the surge limiting circuit further comprises:
- a short circuit detection circuit coupled to the current control circuit wherein the short circuit detection circuit terminates current flow into the current control circuit upon detection of a short in a component in series with the field effect transistor in the protected circuit path; and
- a failsafe circuit, in parallel with the field effect transistor, that limits current flow through the protected circuit path upon a short in a component in series with the field effect transistor in the protected circuit path.

14. The surge limiting circuit of claim 13, wherein the circuit is integrated within a three-terminal discrete device.

15. The surge limiting circuit of claim 13, wherein the short circuit detection circuit includes a PNP bipolar junction transistor.

16. The surge limiting circuit of claim 13, wherein the failsafe circuit is a static resistor.

17. The surge limiting circuit of claim 13, wherein an element sensitive to inrush current is disposed in the protected circuit path.

18. The surge limiting circuit of claim 17, wherein the circuit is integrated within a two-terminal discrete device.

19. The surge limiting circuit of claim 13, wherein the surge limiting circuit is an integrated circuit.

20. The surge limiting circuit of claim 1, wherein the surge limiting circuit further comprises:
- a means for terminating current flow into the current control circuit upon detection of a short in a component in series with the field effect transistor in the protected circuit path; and
- a means for limiting current flow through the protected circuit path upon a short in a component in series with the field effect transistor in the protected circuit path.

21. The surge limiting circuit of claim 1, wherein the current control circuit does not include an over voltage protection device.

22. The over voltage protection device of claim 21, wherein the current control circuit does not include a Zener diode.

* * * * *